J. E. KEY.
LATHE.
APPLICATION FILED JUNE 6, 1906.
944,876. Patented Dec. 28, 1909.
2 SHEETS—SHEET 1.
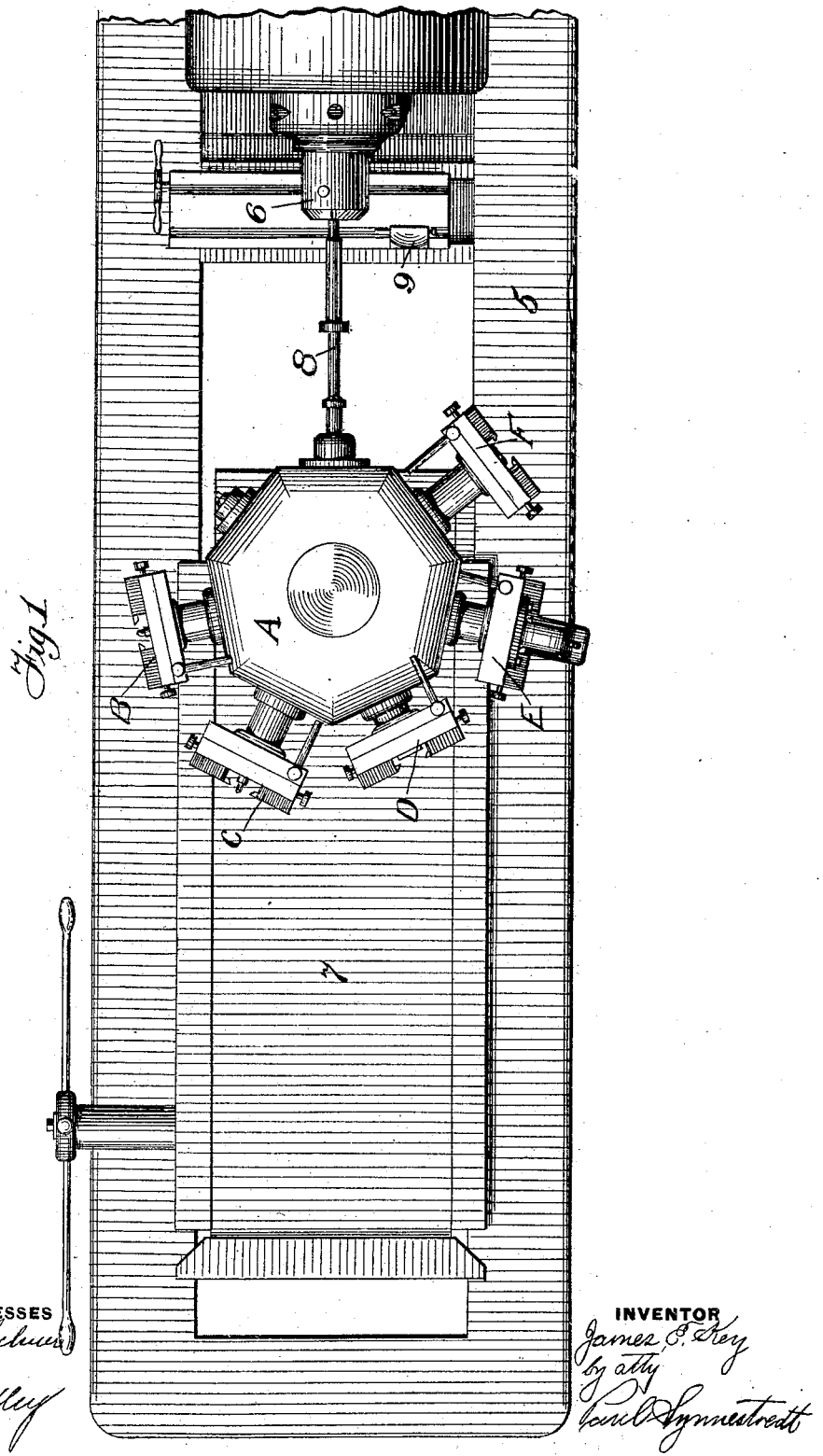
WITNESSES
INVENTOR
James E. Key
by atty

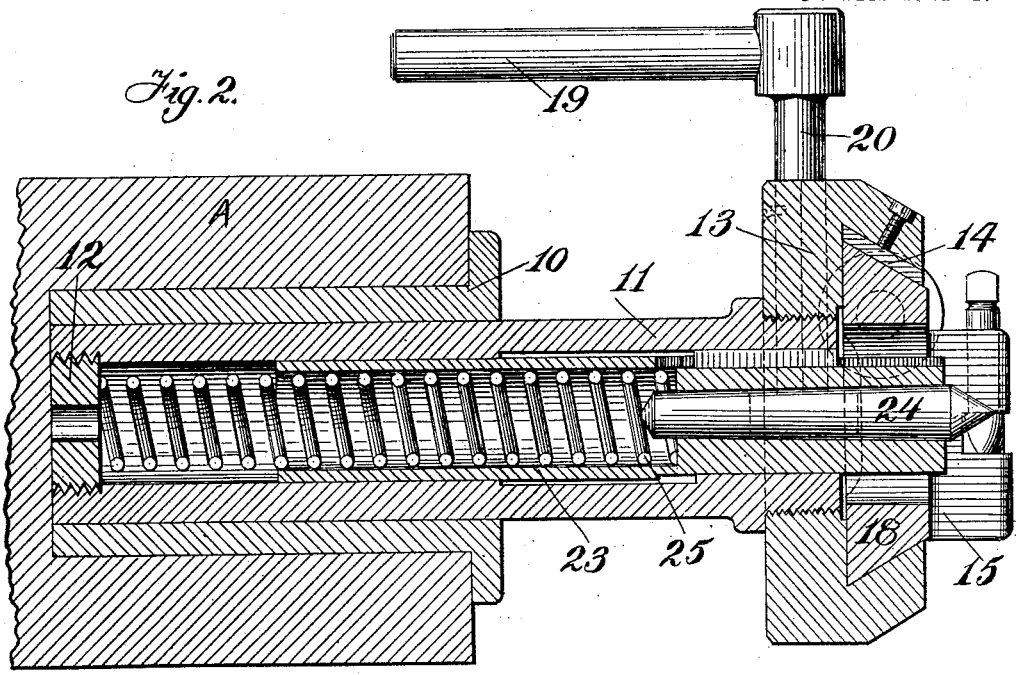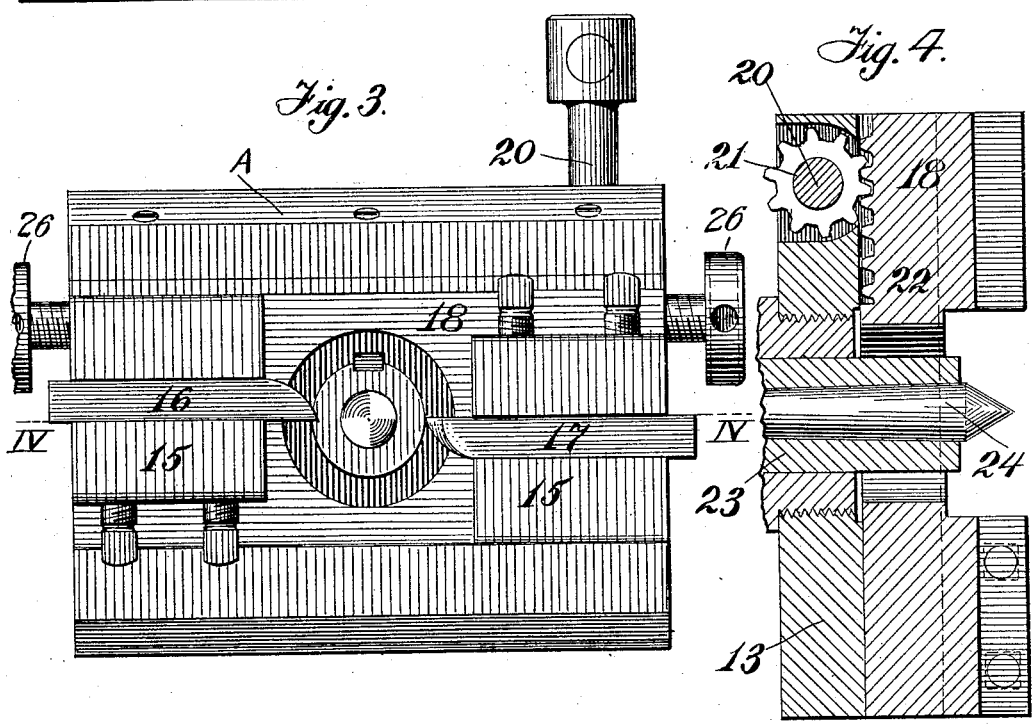

UNITED STATES PATENT OFFICE.

JAMES E. KEY, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LATHE.

944,876.  Specification of Letters Patent.  Patented Dec. 28, 1909.

Original application filed November 13, 1905, Serial No. 287,019. Divided and this application filed June 6, 1906. Serial No. 320,389.

*To all whom it may concern:*

Be it known that I, JAMES E. KEY, a citizen of the United States, residing at Wilmerding, in the county of Allegheny and State of Pennsylvania, have invented certain new and useful Improvements in Lathes, of which the following is a specification.

The invention relates to lathes, and has for its objects; to provide a tool carriage adapted to support the work during the relative movement of such carriage and the work; to provide a tool carriage particularly adapted to support the cutter effectively adjacent to the lathe center; to provide a lathe in which provision is made for preventing any loosening of the work in its lathe center; and finally, to provide a lathe which is especially adapted for accurate work and which may be conveniently and rapidly operated. These and other objects and advantages are accomplished by my invention, one form of which is illustrated in the accompanying drawings, in which Figure 1 is a plan view of a turret lathe embodying my invention;

Figure 2 is a transverse section through the center of a portion of a turret, which in the present case also constitutes the tool carriage;

Figure 3 is a front view of the device as shown in Figure 2, and

Figure 4 is a transverse section through the device on the line IV—IV of Figure 3.

The invention is intended primarily to be used in a turret lathe such as that shown in the plan view of Figure 1, which lathe forms the subject matter of my co-pending application Serial Number 287,019, of which the present case is a division. As shown in this figure, the rotary turret A is provided with a plurality of operating means B, C, D, E, and F, around its periphery, which means are adapted to be brought into position to operate successively on the work which is held in the tool chuck, and my invention relates particularly to the construction of the operating means B and C, which means B and C are substantially the same in construction, and are shown in detail in Figures 2, 3, and 4, of the drawings.

Describing the construction more in detail, and referring to Figure 1, 5 is the bed of the machine, which may be of any preferred type, 6 is the chuck which is adapted to hold the work securely and rotate therewith, A is the turret mounted upon the carriage 7, which parts A and 7 constitute what may be termed the carriage of the device, and 8 is the work, which in this present case is a valve rod for a triple valve, and 9 is the transversely movable tool for cutting the shoulders upon the work.

The particular construction of the lathe center and tool support designated as B is shown in Figures 2, 3, and 4. Two tools are provided opposite each other as indicated in Figure 3 which tools are adapted to make respectively a rough and a finishing cut, and the apparatus is designed especially for reducing portions of the work adjacent the end of the rod. The turret A carries removably the sleeve 10, which sleeve holds the casing 11 provided with the end plug 12. Screwed upon the end of this casing is the block 13 which carries in guide-ways 14 the tool blocks 15, which tool blocks carry respectively a roughing tool 16 and a finishing tool 17 which are adapted to alternately engage the work. The blocks 15 are integral with the back piece 18, and this back piece is reciprocated by means of the handle 19 carried on the shaft 20. This shaft is provided with a pinion 21, which pinion engages the rack 22 on the back of the part 18 as shown in Figure 4. It will be seen that by turning the handle 19 one tool may be withdrawn from the work and the other engage with such work, or, the handle may be turned only partially so that the work lies midway between the tools, which is the position of the tools when the turret is moved longitudinally to commence a cut or to be brought back to position to start a new cut. Means for supporting the end of the work comprise a casing 23 substantially closed at its outer end and carrying the center 24. 26 are a pair of stop screws carried by the back piece 18, the heads of which screws take against the block 13 when the back piece reaches its extreme positions. Between this casing and the plug 12 a spiral spring 25 is interposed, which spring provides for the gradual retreat of the center as the turret is fed along the work to make the cut. It will be apparent from the foregoing description that the carriage or turret which carries the tools also constitutes the tail stock, thereby reducing the usual number of parts in a machine of this kind, and provides an arrangement which may be very easily and conveniently operated. It will also be apparent that by providing a yielding support for the lathe center, the center is always pressed tightly against the end of the work, thereby avoiding any danger of the work becoming loose on the center as is the case where a stationary center is used. This arrangement secures more accurate work, which is especially desirable in work of the character for which this machine is designed.

It will be apparent that my invention is capable of considerable modification without departure from the spirit thereof. The relative movability of the carriage and chuck might be readily reversed and the chuck moved toward the turret instead of feeding the turret toward the chuck without modifying the function and operation of the parts. It will also be seen that the use of the yielding center together with the tool supported upon the same carriage is not confined to use in a turret machine but might be well used in a machine in which there was only a single cutting tool. It will also be apparent that yielding supporting means for the lathe center other than the spring 24 might be provided, and that the casing might be so supported frictionally that a spring would be unnecessary. These and other modifications which will readily occur to those skilled in the art come within the scope of my invention and are comprehended thereby.

Having thus described my invention and illustrated its use, what I claim as new and desire to secure by Letters Patent, is the following:

1. In combination, a supporting casing, a reciprocable center mounted therein, a spring held in advanced position, and constructed to engage the end of the work and support it against lateral movement, a tool carrier mounted on the casing for reciprocation transversely of the center and feed means for moving the carrier in and out.

2. In combination, a supporting casing, closed at its rear end, a centering casing slidably mounted therein and closed at its front end, a spring fitting inside the centering casing and bearing at one end against the closed front end of the centering casing and at the other end against the closed rear end of the supporting casing, and a center carried by the centering casing, and constructed to engage the end of the work and support it against lateral movement.

In testimony whereof, I have hereunto signed my name in the presence of the two subscribed witnesses.

JAMES E. KEY.

Witnesses:
EDMUND SIMPSON,
F. E. GAITHER.